United States Defensive Publication [19] (H) [11] T968,001

Poist [43] Mar. 7, 1978

[54] COAGULATION OF EPOXY ESTER-ACRYLIC EMULSIONS

[76] Inventor: John E. Poist, 27 MacArthur St., High Bridge, N.J. 08829

[21] Appl. No.: 764,325

[22] Filed: Jan. 31, 1977

[51] Int. Cl.[2] ..... C08F 33/02

[52] U.S. Cl. ..... 260/23 EP; 260/18 EP; 260/29.6 NR; 260/836; 260/837 R

[57] ABSTRACT

A coating coagulation bath is disclosed containing an emulsified graft copolymer of an epoxy ester and an alpha beta ethylenically unsaturated monomer. The bath itself is self-coagulatable in that a metal panel dipped into the bath will exhibit a coating on its surface immediately after removal.

10 Claims, No Sheets Drawing,

20 Pages Specification

The file of this unexamined application may be inspected and copies thereof may be purchased (849 O.G. 1221, Apr. 9, 1968).